Sept. 25, 1956    H. HORNSCHUCH    2,764,434
SEALING DEVICE
Filed Jan. 19, 1954

INVENTOR
HANNS HORNSCHUCH
BY
HIS ATTORNEY.

United States Patent Office 2,764,434
Patented Sept. 25, 1956

2,764,434

SEALING DEVICE

Hanns Hornschuch, Easton, Pa., assignor to Ingersoll-Rand Company, New York, N. Y., a corporation of New Jersey Application January 19, 1954, Serial No. 404,969

5 Claims. (Cl. 286—15)

This invention relates to sealing devices, and more particularly to a sealing device for centrifugal pumps and the like.

More specifically the sealing device is of the type known as a mechanical seal in which two members disposed about the shaft of a pump cooperate with each other to control the leakage of fluid along the shaft, such leakage being preferably held to an amount that is merely sufficient to lubricate the sealing surfaces of the device.

It has been customary, in prior structures of this nature, to affix one of the sealing components to the pump shaft and arrange the cooperating component such wise as to enable it to have a rather wide range of movement axially and complete freedom of rotative movement relatively to the shaft. This arrangement and mode of operation is in some respects unsatisfactory, mainly because it enables the axially-movable component to assume and remain in positions that permit the unrestrained flow of fluid through the sealing device. Such structures are, moreover, usually of large bulk and require a considerable space on the shaft for their accommodation. This, in turn, necessitates a wide spacing of the shaft bearings relatively to each other and is objectionable because the shaft may then deflect unduly and cause damage to the pump parts.

It is an object of the present invention to minimize the bulk of the parts constituting the sealing device.

Another object is to obviate the chances of damage to the pump parts by reason of deflection of the pump shaft.

Still another object is to assure the correct sealing positions of the sealing components under all operating conditions of the pump, and A further object is to maintain fluid leakage along the pump shaft to approximately the amount required to assure adequate lubrication of the sealing surfaces.

Other objects will be in part obvious and in part pointed out hereinafter.

Figure 1:
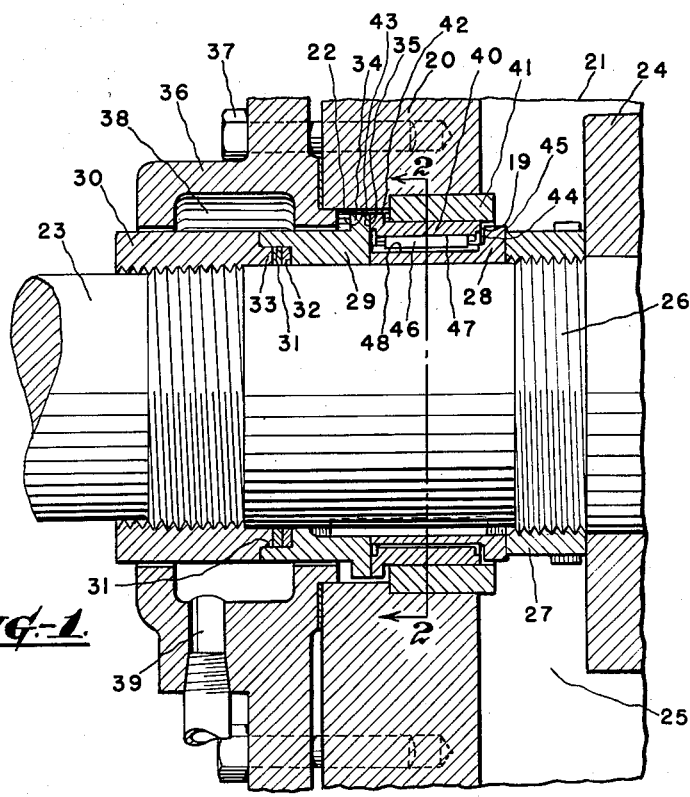
Figure 2:
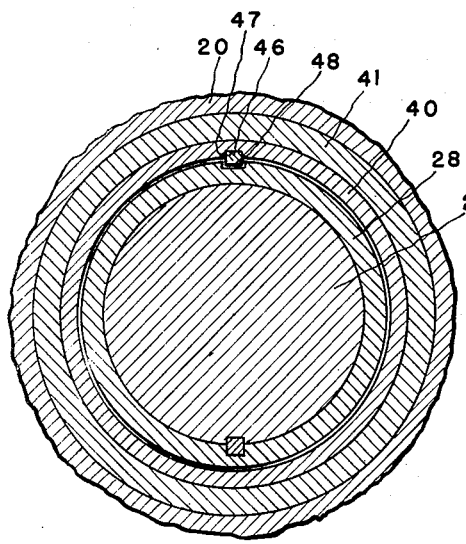
Figure 3:
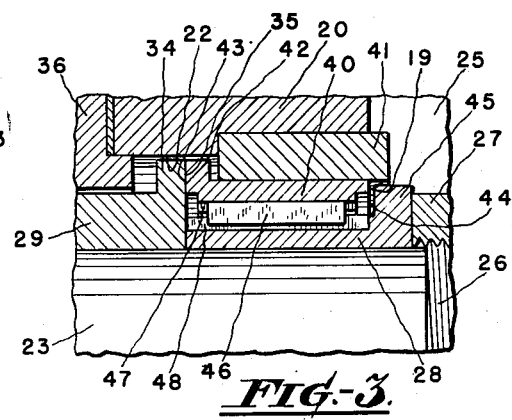

In the drawings accompanying this specification and in which similar reference numerals refer to similar parts, Figure 1 is an elevation, partly broken away, of a fragmentary portion of the pump having the invention applied thereto, Fig. 2 is a transverse view taken through Figure 1 on the line 2—2 looking in the direction indicated by the arrows, and Fig. 3 is a view similar to Figure 1 showing the sealing device somewhat enlarged.

Referring more particularly to the drawings, 20 designates an end wall of a pump casing 21 having a bore 22 therethrough to receive a shaft 23.

The shaft projects from the casing for connection to a prime mover and carries an impeller only the hub portion 24 of which is shown extending into a chamber 25 that is subjected to the final discharge pressure of the pump. The portion of the shaft adjacent the hub 24 has threads 26 for the accommodation of a nut 27 which abuts the hub 24 and serves as an abutment for a retaining member 28 in the form of a sleeve that encircles the shaft 23 and is held against the nut 27 by a sleeve 29 which is pressed against the retaining member 28 by a nut 30 threaded onto the shaft 23.

The retaining member 28 and the sleeve 29 preferably have close fits on the shaft 23, and in order to still further decrease the chances of leakage of fluid along the surface of the shaft the sleeve 29 is recessed internally, as at 31, in its outer end portion to receive packing material 32 which is compressed by an annular extension 33 on the nut 30. Owing to this arrangement the sleeve 29 and the retaining member will be held fixedly upon the shaft 23 and will, therefore, rotate with the shaft.

The sleeve 29 constitutes an element of the sealing device. It has an external annular flange 34 the inner end surface of which serves as a sealing surface 35 and lies normal to the shaft 23. The flange 34 is of smaller diameter than the bore 22 to prevent contact thereof with the adjacent stationary parts of the pump in the event that the portion of the shaft carrying the sealing device is deflected in operation. For the same reason, the external diameters of the sleeve 29 and the nut 30 are also of smaller diameters than the encircling portion of the pump casing which, in the present instance, consists of a head 36 that forms a closure for the outer end of the bore and is secured to the pump casing 21 by bolts 37.

An additional function of the head 36 is to intercept any fluid that may issue from the bore 22 and has an annular recess 38 for the reception of such fluid and a vent 39 through which fluid may drain from the recess.

The other component of the sealing device is also in the form of a sleeve, designated 40 herein, and rotates with the shaft. It has a running fit in a wearing ring 41 inserted in the wall 20 and its internal diameter is sufficiently larger than the outer diameter of the retaining member 28 which it encircles to obviate the chances of contact between the two under all conditions of operation.

The sleeve 40 also has an external flange 42 and a sealing surface 43 on the outer end thereof to cooperate with the sealing surface 35 for controlling the leakage of fluid through the bore 22. The sleeve 40 is urged toward the sealing surface 35 by the pressure of the fluid in the chamber 25 which acts against the opposite end surface 19 of the sleeve 40, and the relative areas of the surfaces 35 and 43 are such that the pressure gradient of the fluid passing between them will be sufficiently higher than the opposing pressure on the surface 19 to permit the passage of only an amount of liquid through the sealing device necessary to lubricate the sealing surfaces.

The sleeve 40, unlike the sleeve 29, is capable of movement axially of the shaft. Such movement is held to a length that will permit the passage of only the desired amount of fluid between the sealing surfaces and, in practice, has been found to be approximately .003 of an inch. The clearance required for this distance of travel of the sleeve 40 is indicated at 44. It is shown of exaggerated size for the purpose of illustration, and endwise movement of the sleeve 40 in one direction is controlled by the sealing surface 35 and in the opposite direction by a flange 45 on the retaining member 28 and overlying the surface 19 of the sleeve 40.

Rotary movement is transmitted from the shaft to the sleeve 40 by a key 46 seated in keyways 47 and 48 in the sleeve 40 and the retaining member 28, respectively. The key 46 may, if desired, have a tight fit in one of the keyways and a loose fit in the other or have a free floating fit in both keyways, but should be capable of free movement relatively to either the retaining member 28 or the sleeve 40 to prevent the transmission of shock through the key to the sleeve 40 in the event of an erratic movement of the shaft 23. The key 46 is, moreover, of less width than the distance between the bottoms of the keyways 47 and 48 in the normal positions of the parts to prevent simultaneous engagement thereof with both bottoms.

In practice, some of the fluid in the chamber 25 flows through the sleeve 40 to the sealing surfaces 35 and 43 and will normally hold the sleeve 40 in a position to permit only a thin film of fluid to pass between the sealing surfaces. The amount of fluid that can pass through the sealing device can in no case be greater than is permitted by the clearance 44 originally provided, even though the sleeve 40 is restrained from assuming its normal position by particles of solid material which at times adhere to the sealing surfaces.

From the foregoing description, it will be obvious to those skilled in the art that by rotating both of the sealing components with the shaft the sealing surfaces will be protected against the extreme wear that usually occurs in structures wherein one of the sealing members rotates relatively to the other. It will be further apparent that by providing ample clearance between the sleeve 29 and the pump casing and between the sleeve 40 and the retaining device 28 these important elements will be protected against damage through shock whenever the shaft 23 is deflected as, for example, during a starting period of the pump.

A further highly desirable advantage of a sealing device constructed in accordance with the practice of the invention is that it may be of short length and of small bulk as compared with known structures, thus making it possible to shorten the distance between the pump bearings and thereby minimize deflection of the shaft.

I claim:

1. In a sealing device, the combination of a casing having a bore and a rotor extending through the bore, a sleeve on the rotor having a sealing surface, means for securing the sleeve immovably to the rotor, a second sleeve in the bore loosely encircling the rotor and having its outer periphery in sealing contact with the bore surface, said second sleeve also having a sealing surface to cooperate with the first mentioned sealing surface for controlling leakage of fluid through the bore and movable through a small range of endwise movement relatively to the first mentioned sleeve, and means connecting the second mentioned sleeve to the rotor for rotation with said rotor.

2. In a sealing device, the combination of a casing having a bore and a rotor extending through the bore, a sleeve on the rotor having a sealing surface, means for securing the sleeve immovably to the rotor, a second sleeve loosely encircling the rotor and having a running fit in the bore and movable endwise therein, a sealing surface on the second mentioned sleeve to cooperate with the first mentioned sealing surface for controlling leakage of fluid through the bore, means for limiting the degree of endwise movement of said second sleeve, and means connecting the second mentioned sleeve to the rotor for rotation with said rotor.

3. In a sealing device, the combination of a casing having a bore and a rotor extending through the bore, a sleeve on the rotor having a sealing surface, means for securing the sleeve immovably to the rotor, a second sleeve encircling the rotor in spaced relation therewith having a running fit in the bore and being capable of a small degree of endwise movement therein, a sealing surface on the said second sleeve to cooperate with the first mentioned sealing surface for controlling the leakage of fluid through the bore, means for limiting the degree of endwise movement of said second sleeve, and means connecting the second sleeve to the rotor for rotation with the rotor.

4. In a sealing device, the combination of a casing having a bore and a rotor extending through the bore, a sleeve on the rotor of smaller diameter than the bore to prevent contact of said sleeve with the surface of the bore, means for securing the sleeve immovably to the rotor, a sealing surface on the sleeve, a second sleeve encircling the rotor in spaced relation therewith having a running fit in the bore and being capable of a small degree of endwise movement therein, a sealing surface on said second sleeve to cooperate with the first mentioned sealing surface for controlling the leakage of fluid through the bore, and means connecting the second mentioned sleeve to the rotor for rotation therewith.

5. In a sealing device, the combination of a casing having a bore and a rotor extending through the bore, a sleeve on the rotor of smaller diameter than the bore to prevent contact of the sleeve with the surface of the bore, means for securing the sleeve immovably to the rotor, an annular sealing surface on the sleeve, a second sleeve encircling the rotor in spaced relation therewith having a running fit in the bore and being capable of a small degree of endwise movement therein, an annular sealing surface on said second mentioned sleeve to cooperate with the first mentioned sealing surface for controlling the leakage of fluid through the bore, keyways in the said second sleeve and in the rotor, and a key in the keyways for drivingly connecting the said second sleeve to the rotor and having a loose fit in at least one of the keyways.

References Cited in the file of this patent

UNITED STATES PATENTS

| | | |
|---|---|---|
| 1,457,584 | McCuen | June 5, 1923 |
| 2,203,525 | Dupree | June 4, 1940 |
| 2,328,578 | Payne | Sept. 7, 1943 |
| 2,586,739 | Summers | Feb. 19, 1952 |